M. T. O'MALLEY.
GUARD FOR SLIVER LAP AND RIBBON LAP MACHINES.
APPLICATION FILED JULY 15, 1918.
1,306,711.
Patented June 17, 1919.
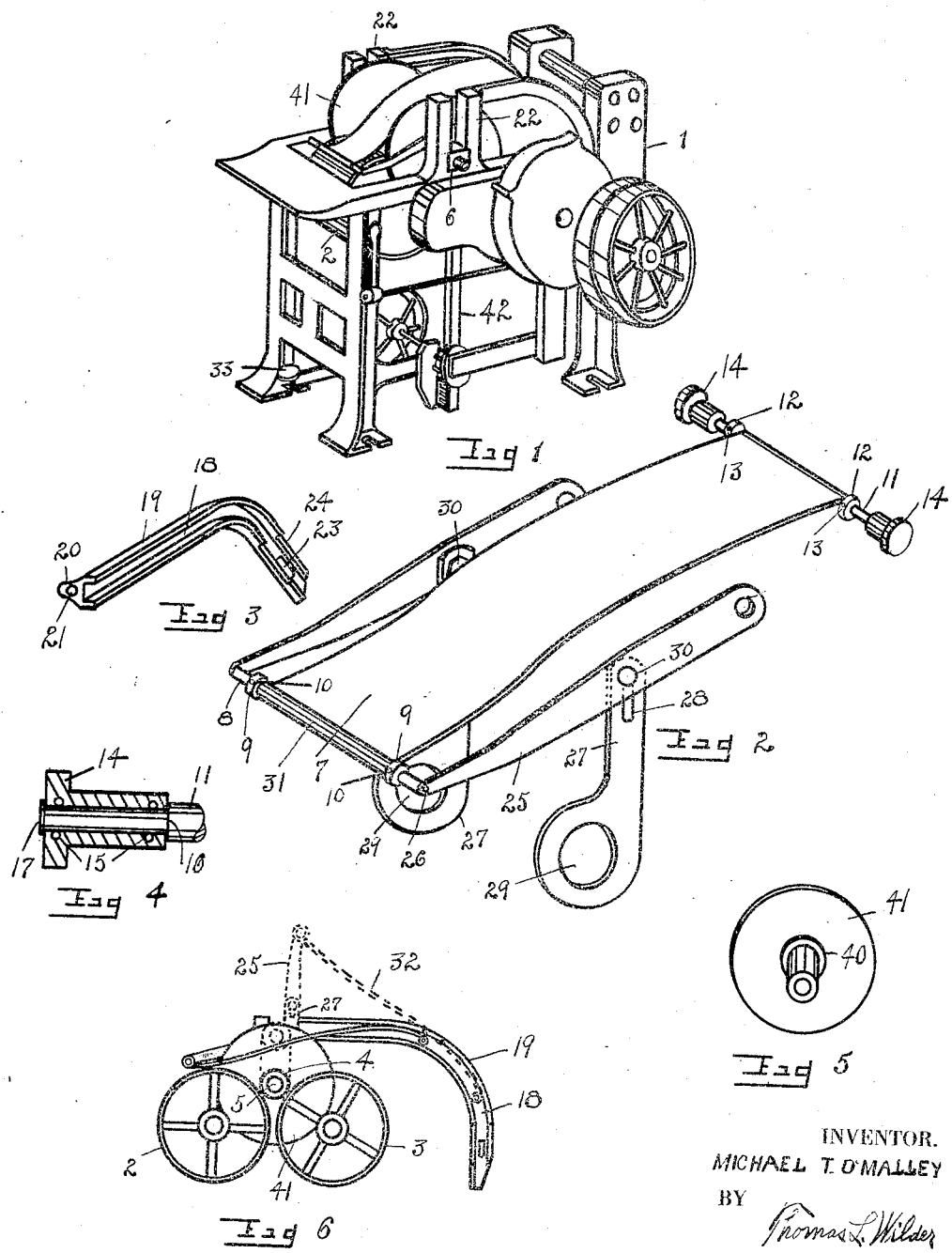
INVENTOR.
MICHAEL T. O'MALLEY
BY
Thomas L. Wilder
ATTORNEY.

UNITED STATES PATENT OFFICE.

MICHAEL T. O'MALLEY, OF NEW HARTFORD, NEW YORK, ASSIGNOR TO WHITIN MACHINE WORKS, OF WHITINSVILLE, MASSACHUSETTS, A CORPORATION OF MASSACHUSETTS.

GUARD FOR SLIVER-LAP AND RIBBON-LAP MACHINES.

1,306,711.  Specification of Letters Patent.  Patented June 17, 1919.

Application filed July 15, 1918. Serial No. 244,899.

*To all whom it may concern:*

Be it known that I, MICHAEL T. O'MALLEY, a citizen of the United States, residing at New Hartford, in the county of Oneida and State of New York, have invented certain new and useful Improvements in Guards for Sliver-Lap and Ribbon-Lap Machines, of which the following is a specification, reference being had thereto in the accompanying drawing.

My invention relates to a guard for sliver lap and ribbon lap machines, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a guard for use more particularly in connection with sliver lap or ribbon lap machines. Heretofore, in machines of this character, it has been customary for the operator, when replacing on the machine a wound spool with an empty one, to give the spool a spin manually, whereby to engage the free ends of the sliver laps thereon. This is particularly hazardous and more so, if the machine is started at the same time, as is done oftentimes by an inexperienced or careless operator. When the machine is operating, the drums against which the spool rests are revolving toward each other, so that a manual spin of the spool will invariably cause the fingers of the operator to get caught between the revolving drums and thereby crush or mutilate the same. This invention is designed to cover the spool and drums automatically before the machine starts, whereby there is no possible manner in which the operator can insert his hand within the machine to reach the spool when once put in operation. To this end, the machine embodies a cover or guard that will move automatically into place when the machine is started. The object will be further understood by referring to the drawings in which:

Figure 1 is a perspective view of the front portion of a sliver lap machine, showing the guard attached thereto;

Fig. 2 is a perspective view, enlarged, of the guard and immediate parts;

Fig. 3 is an enlarged view, showing a perspective of a rail employed;

Fig. 4 is an enlarged view showing a vertical section of a roller and immediate parts in elevation;

Fig. 5 is an enlarged perspective view of a disk and hollow shaft forming a part of a spool employed;

Fig. 6 is a detail view, showing the relative arrangement of the guard and parts of the sliver lap or ribbon lap machine covered by said guard.

Referring more particularly to the drawings, the frame of a sliver lap machine, which is of well known construction and forms no part of the present invention is represented by —1—. This frame —1— carries the fluted drum 2 and the smooth drum 3 which are adapted to revolve in the same directions with their adjacent faces moving in opposite directions, whereby to turn by frictional contact the spool 4 upon which is wound in an accumulated manner the laps of the cotton yarn. The spool 4 is supported in a rotary manner by a shaft 5 that is mounted in the vertically movable bearings 6—6 which gradually rise, as the laps of cotton are wound on the spool 4, thereby increasing its diameter, as is well known in the art.

The guard which is adapted to cover the spool 4 and drums 2 and 3, embodies a relatively flat sheet of metal 7 that is wound at one end about the shaft 8 between the collars 9—9. The collars 9 are held in place by rivets 10 that pass through the shaft 8. The other end of the flat piece of metal is wound about the shaft 11 between the collars 12—12 likewise held in place by rivets 13. The free ends of the shaft 11 form axles for the mounting of the rollers 14—14 which are equipped with the bearings 15. The ends of the shaft 11 are reduced to form shoulders at 16—16 and slightly upset at 17, whereby to hold the rollers 14 in place. The rollers 14 are adapted to run in the guide grooves 18—18 formed in the rails 19—19 that are attached to the frame —1—. Each of the rails 19 is provided with a wing 20 having an aperture 21 for the insertion of a bolt, whereby to attach the contiguous end of the rail 19 to the bearing post 22 of the frame —1— and also with an elongated slot 23, whereby to attach the opposite end to the frame —1—. The edges of the rails 19 are reduced at 24 in order to permit the rails to fit snugly against certain parts of the frame —1—.

The ends of the shaft 8 disposed at the free part 31 of the guard pivotally support the levers 25—25. The said ends being reduced to form shoulders and upset at 26, whereby to hold the levers 25 in position at that point. The opposite ends of the levers 25 are pivoted or fulcrumed upon shafts projecting from the inner sides of the bearing posts 22—22. An arm 27 having an elongated slot 28 and an aperture 29 is pivoted to each of the levers 25 by a headed bolt 30 used in each instance. The ends of said bolts being upset to hold the same in place. The slots 28 in the arms 27 permit a certain amount of freedom of action between the arms 27 and the levers 25, which freedom is necessary in view of the respective movements of said parts and also in order to prevent the breaking at the junctions in the event that the spool 4 should become too full of sliver laps. The apertures 29 of the arms 27 have bearings upon the hubs 40 of the disks 41 and are a little larger in diameter than the hubs to avoid frictional contact as much as possible. The elevation of the shaft 5, as the laps of cotton accumulate upon the spool 4, will cause the arms 27 to elevate the ends of the levers 25 holding the shaft 8, and in turn effect an elevation of the free end 31 of the guard to allow for the increase in diameter of the spool 4, as the sliver laps of cotton accumulate thereon. Sufficient space is provided between the edges of the metal sheet 7 and the levers 25 for the projection therebetween of the disk portions 41 of the spool 4.

At the beginning of the operation of winding the spool 4 with the sliver laps of cotton, the free end 31 of the guard is disposed close to the surface of the fluted drum 2, so that the operator cannot insert his hand between the guard or metal sheet 7 and the drum 2. As the sliver laps of cotton accumulate upon the spool 4 and the same becomes larger in diameter, the free end 31 of the guard will rise to compensate for the difference. The shaft 11 acts as a fulcrum for the metal piece 7 of the guard, in this instance, and the arms 27 fulcrumed to the hubs 40 mounted on the vertically movable shaft 5 will effect said elevation. As the end 31 of the guard rises, the rollers 14 carrying the shaft 11 and the opposite end of the guard will ride slowly down the grooves 18 in the rails 19, thereby causing the metal piece 7 of the guard to change its relative position. Immediately the spool 4 is filled to capacity, the sliver lap machine is stopped automatically by well known mechanism. The racks 42 can be raised then manually to elevate the shaft 5 and spool 4 to highest position. As the racks 42 are raised manually, the metal piece 7 of the guard will assume the substantially vertical position 32 illustrated in dotted lines in Fig. 6, in which latter position, the said guard will be out of the way to permit of the insertion of an unwound spool 4 in assembled position upon the machine. When next the operator presses upon the foot treadle 33 to lower the spool 4 against the surfaces of the drums 2 and 3, preparatory to starting the machine, the guard will be moved automatically back into the full line position shown in Fig. 1 by the levers 25 and arms 27 fulcrumed to the hubs 41 mounted upon the vertically movable shaft 5.

Having thus described my invention what I claim as new and desire to secure by Letters Patent is:

1. In a guard for sliver lap and ribbon lap machines, means for covering certain parts of said machines, means for permitting said covering to automatically rise and fall with the parts of said machines, and means for permitting said covering to move bodily to assume a substantially vertical position.

2. In a guard for sliver lap and ribbon lap machines, a flat sheet of metal for covering certain parts of said machines, means for elevating one end of said sheet of metal, whereby to allow for the elevation of certain parts of said machines, and means for permitting said cover to move bodily to change its relative position, whereby to uncover the certain parts of said machines.

3. In a guard for sliver lap and ribbon lap machines, a flat sheet of metal for covering certain parts of said machines, levers connected with said sheet of metal, arms having elongated slots pivotally connected with said levers, means for actuating said arms, whereby to elevate said sheet of metal to allow for the rise of certain parts of said machines and means for permitting said sheet of metal to move bodily.

4. In a guard for sliver lap and ribbon lap machines, rotary drums, a lap spool mounted between said drums, a movable shaft for elevating said lap spool, a member adapted to cover said drums, levers connected with said member, arms connecting said levers with the movable shaft, whereby said member will rise and fall with said movable shaft and means for permitting said member to move bodily.

5. In a guard for sliver lap and ribbon lap machines, rotary drums, a lap spool mounted between said drums, a vertically movable shaft for mounting said lap spool, a member adapted to cover said drums, means connecting said member with the movable shaft, whereby one end of said member will rise and fall with said shaft, and means for permitting said member to move bodily to change its relative position with respect to said drums.

6. In a guard for sliver lap and ribbon lap machines, having rotary drums, a lap spool mounted between said drums, a vertically movable shaft for carrying said spool, a member for covering said drums and spool, means connecting said member with the vertically movable shaft, whereby one end of said member will rise and fall with said shaft, and rollers on one end of said member, whereby said member can move bodily to change its relative position with respect to said drums and spool.

7. In a guard for sliver lap and ribbon lap machines, having rotary drums, a lap spool mounted between said drums, a vertically movable shaft for carrying said spool, a substantially flat sheet of metal for covering said drums and spool, levers connecting said sheet of metal with the frame of said machines, arms connecting said piece of metal with the vertically movable shaft, whereby one end of said sheet of metal will rise and fall with said shaft, and rollers on one end of said sheet of metal, whereby said sheet can move bodily to change its position to uncover the drums and spool.

In testimony whereof I have affixed my signature.

MICHAEL T. O'MALLEY.

Copies of this patent may be obtained for five cents each, by addressing the "Commissioner of Patents, Washington, D. C."